(12) United States Patent
Gabrielli et al.

(10) Patent No.: US 10,776,124 B2
(45) Date of Patent: Sep. 15, 2020

(54) HANDLING EXCEPTIONAL CONDITIONS FOR VECTOR ARITHMETIC INSTRUCTION

(71) Applicant: ARM LIMITED, Cambridge, Cambridgeshire (GB)

(72) Inventors: Giacomo Gabrielli, Cambridge (GB); Nigel John Stephens, Cambridge (GB)

(73) Assignee: ARM Limited, Cambridge (GB)

( * ) Notice: Subject to any disclaimer, the term of this patent is extended or adjusted under 35 U.S.C. 154(b) by 36 days.

(21) Appl. No.: 15/769,558

(22) PCT Filed: Sep. 14, 2016

(86) PCT No.: PCT/GB2016/052837
§ 371 (c)(1),
(2) Date: Apr. 19, 2018

(87) PCT Pub. No.: WO2017/068318
PCT Pub. Date: Apr. 27, 2017

(65) Prior Publication Data
US 2018/0293078 A1    Oct. 11, 2018

(30) Foreign Application Priority Data

Oct. 22, 2015    (GB) .................................. 1518735.4

(51) Int. Cl.
*G06F 9/38* (2018.01)
*G06F 9/30* (2018.01)

(52) U.S. Cl.
CPC .......... *G06F 9/3865* (2013.01); *G06F 9/3001* (2013.01); *G06F 9/30036* (2013.01)

(58) Field of Classification Search
None
See application file for complete search history.

(56) References Cited

U.S. PATENT DOCUMENTS 4,873,630 A * 10/1989 Rusterholz .............. G06F 9/325
712/3
6,378,067 B1 * 4/2002 Golliver .............. G06F 9/30036
712/244

(Continued)

FOREIGN PATENT DOCUMENTS

WO    WO 2013/095608    6/2013

OTHER PUBLICATIONS

International Search Report and Written Opinion of the ISA for PCT/GB2016/052837, dated Jan. 2, 2017, 10 pages.

(Continued)

*Primary Examiner* — John M Lindlof
(74) *Attorney, Agent, or Firm* — Nixon & Vanderhye P.C.

(57) ABSTRACT

Processing circuitry supports a first type of vector arithmetic instruction specifying at least a first input vector. When at least one exceptional condition is detected for an arithmetic operation performed for a first active data element of the first input vector in a predetermined sequence, the processing circuitry performs at least one response action. When the at least one exceptional condition is detected for a given active data element other than the first active data element in the predetermined sequence, the processing circuitry suppresses the at least one response action and stores elements identifying information identifying which data element is the given active data element which triggered the exceptional condition. This can be useful for reducing the amount of hardware resource for tracking the occurrence of the exceptional conditions and/or supporting speculative execution of vector instructions.

20 Claims, 9 Drawing Sheets

(56) References Cited

U.S. PATENT DOCUMENTS

| | | |
|---|---|---|
| 2010/0325483 A1* | 12/2010 | Gonion ............... G06F 8/4441 |
| | | 714/10 |
| 2011/0047358 A1 | 2/2011 | Eichenberger et al. |
| 2012/0233507 A1 | 9/2012 | Gonion |
| 2014/0208086 A1 | 7/2014 | Bradbury et al. |
| 2014/0244987 A1 | 8/2014 | Garbacea et al. |
| 2015/0261590 A1* | 9/2015 | Sperber ............... G06F 11/0721 |
| | | 714/42 |

OTHER PUBLICATIONS

Combined Search and Examination Report for GB1518735.4, dated Apr. 20, 2016, 8 pages.

Office Action for TW Application No. 105130975 dated Apr. 30, 2020 and English translation, 21 pages.

* cited by examiner

```
non-speculative:    :
    while (1) {
        VFPADD Zr, Za, Zb, Pk
        IF cond (Zc [ j ]) = TRUE, break
```

FIG. 8

```
    }
speculative:
    while (1) {
                Pk = Pg
    retry:      SETFFR              /─ 100
      102 /─  VFPADDFF Zr, Za, Zb, Pk
      104 /─  IF cond (Zr [ j ]) = TRUE, break
      106 /─  Pk = remain (Pg, FFR)
      108 /─  BR retry IF Pk! = ALL FALSE
    }
```

FIG. 9

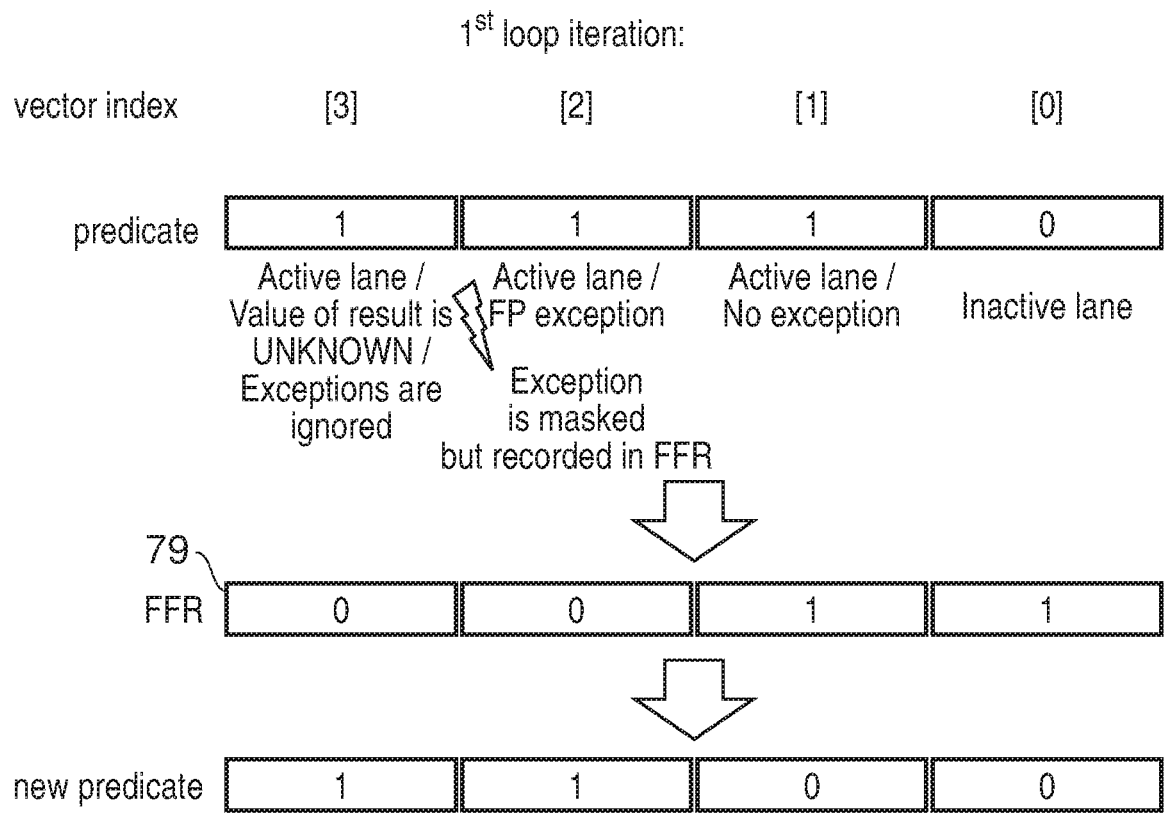
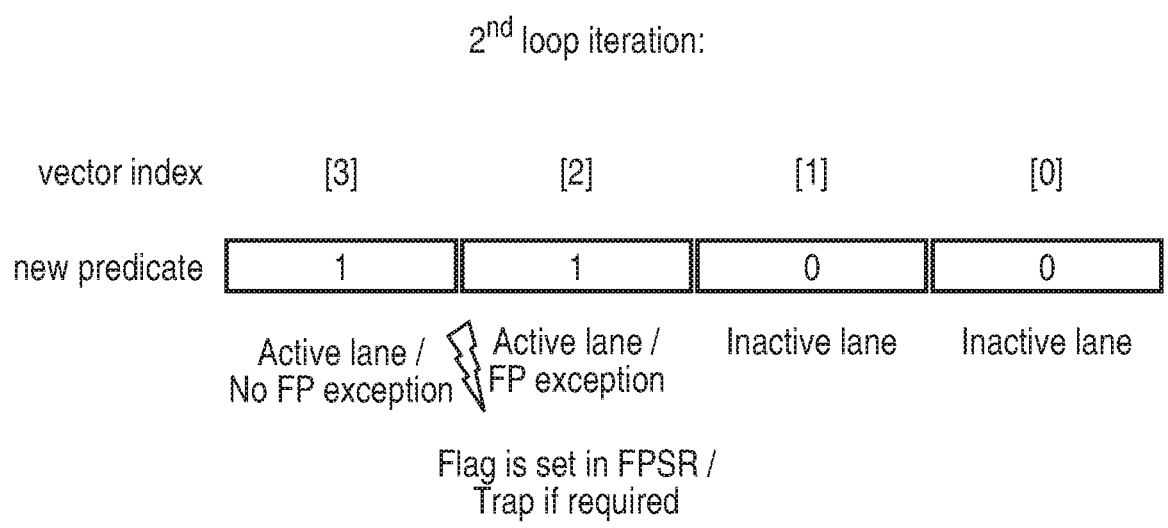
FIG. 10

| 31 | | 24 | 23 | | 16 | 15 | | 8 | 7 | | 0 |
|----|----|----|----|----|----|----|----|----|----|----|----|
| 0 |QC3| 0 |QC2| [2] 0 | 0 |QC1| [1] 0 |IDC|QC0| 0 |IXC|UFC|OFC|DZC|IOC|

78-1, 78-2

IDC, bit [7]
  FP Input Denormal cumulative flag
QCn, bits [6, 14, 22, 30]
  Integer Saturation cumulative flag on bytes 0, 1, 2 and 3.
IXC, bit [4]
  FP Inexact cumulative flag
UFC, bit [3]
  FP Underflow cumulative flag
OFC, bit [2]
  FP Overflow cumulative flag
DZC, bit [1]
  FP Division by Zero cumulative flag
IOC, bit [0]
  FP Invalid Operation cumulative flag
Bit [5, 8-13, 15-21, 23-29, 31]
  Reserved, RES0

FIG. 12

SIMD instructions might update the status flags in FPSR1, i.e. the "speculative" versions of the flags

FPSR1  78-1

Software speculation is resolved: the COMMIT instruction ORs FPSR1 with FPSR2, i.e. with the "non-speculative" version

FPSR2  78-2

The COMBINE instruction is used to convert the vectorized view of the status flags into the traditional scalar view

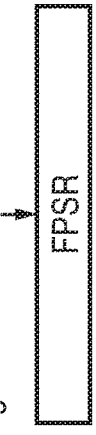
FPSR

FIG. 13

HANDLING EXCEPTIONAL CONDITIONS FOR VECTOR ARITHMETIC INSTRUCTION

This application is the U.S. national phase of International Application No. PCT/GB2016/052837 filed 14 Sep. 2016, which designated the U.S. and claims priority to GB Patent Application No. 1518735.4 filed 22 Oct. 2015, the entire contents of each of which are hereby incorporated by reference.

The present technique relates to the field of data processing. More particularly, it relates to processing of a vector arithmetic instruction.

Some data processing apparatuses may support vector processing in which a given processing operation may be performed on each data element of a vector to generate corresponding data elements of a result vector. This allows a number of different data values to be processed with a single instruction, to reduce the number of program instructions required to process a given number of data values. Vector processing can also be referred to as SIMD (single instruction, multiple data) processing.

At least some examples provide an apparatus comprising:
processing circuitry to perform, in response to a first type of vector arithmetic instruction specifying at least a first input vector comprising a plurality of data elements, an arithmetic operation for at least one active data element of the first input vector;
wherein the data elements of the first input vector have a predetermined sequence;
when at least one exceptional condition is detected for the arithmetic operation performed for a first active data element in the predetermined sequence, the processing circuitry is configured to perform at least one response action; and
when the at least one exceptional condition is detected for the arithmetic operation performed for a given active data element other than said first active data element in said predetermined sequence, the processing circuitry is configured to suppress said at least one response action and to store element identifying information identifying which data element of the first input vector is said given active data element.

At least some examples provide an apparatus comprising:
means for performing, in response to a first type of vector arithmetic instruction specifying at least a first input vector comprising a plurality of data elements, an arithmetic operation for at least one active data element of the first input vector;
wherein the data elements of the first input vector have a predetermined sequence;
when at least one exceptional condition is detected for the arithmetic operation performed for a first active data element in the predetermined sequence, the means for performing is configured to perform at least one response action; and
when the at least one exceptional condition is detected for the arithmetic operation performed for a given active data element other than said first active data element in said predetermined sequence, the means for performing is configured to suppress said at least one response action and to store element identifying information identifying which data element of the first input vector is said given active data element.

At least some examples provide a data processing method comprising:
in response to a first type of vector arithmetic instruction specifying at least a first input vector comprising a plurality of data elements, performing an arithmetic operation for at least one active data element of the first input vector, wherein the data elements of the first input vector have a predetermined sequence;
when at least one exceptional condition is detected for the arithmetic operation performed for a first active data element in the predetermined sequence, performing at least one response action; and
when the at least one exceptional condition is detected for the arithmetic operation performed for a given active data element other than said first active data element in said predetermined sequence, suppressing said at least one response action and storing element identifying information identifying which data element of the first input vector is said given active data element.

At least some examples provide a computer program stored on a computer readable storage medium that, when executed by a data processing apparatus, provides a virtual machine which provides an instruction execution environment corresponding to the apparatus as described above.

Further aspects, features and advantages of the present technique will be apparent from the following description of examples, which is to be read in conjunction with the accompanying drawings, in which:

FIG. 1 schematically illustrates an example of a data processing apparatus supporting vector processing;

FIG. 8 shows an example of pseudo code for non-speculative execution of a vector arithmetic instruction;

FIG. 9 shows an example of pseudo code for speculative execution of a vector arithmetic instruction;

FIG. 10 shows an example of a loop for executing the vector arithmetic instruction multiple times until all active elements have been processed;

FIG. 12 shows an alternative layout for the floating point status register;

FIG. 13 shows a technique for handling speculative execution of a vector arithmetic instruction using the status register layout of FIG. 12.

Figure 1:
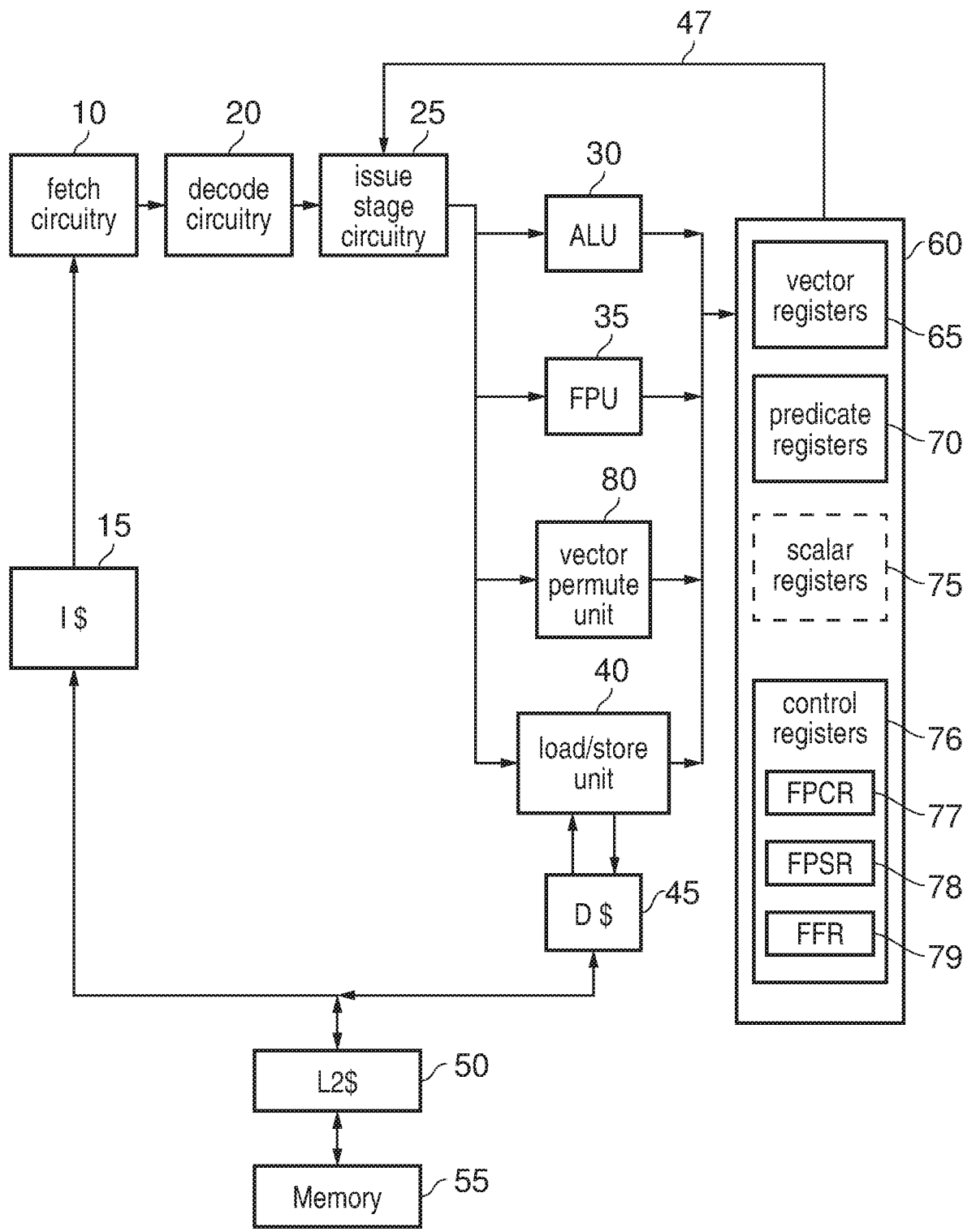

Some specific examples will now be described. It will be appreciated that the invention is not limited to these particular examples.

Processing circuitry may support at least a first type of vector arithmetic instruction which specifies at least a first input vector comprising multiple data elements. In response to the first type of vector arithmetic instruction, the processing circuitry may perform on an arithmetic operation for at least one active data element of the first input vector. Sometimes, an exceptional condition may be detected for the arithmetic operation performed for one or more of the active data elements of the first input vector. For example, the exceptional condition could indicate that the result has gone out of the range that can be represented by the result value, or that an error has occurred.

The data elements of the first input vector may be considered to have a predetermined sequence. When at least one exceptional condition is detected for the arithmetic operation performed for a first active data element in the sequence, the processing circuitry may perform at least one response action. However, when the at least one exceptional condition is detected for the arithmetic operation performed for a given active data element other than the first active data element in the sequence, then the processing circuitry may suppress the at least one response action and store element identifying information identifying which data element of the first input vector is the given active data element for which the exceptional condition was detected.

This approach may provide several advantages. Firstly, tracking the exceptional conditions that have been detected, and if necessary performing at least one response action, may require certain resources to be provided in the processing circuitry. Providing such resources separately for each lane of the vector processing being performed may be expensive in terms of circuit area and in terms of the overhead of managing such resources. In practice, exceptional conditions may be relatively rare and so this overhead may not be justified. By performing the response action when the exceptional condition is performed for the first active data element in the sequence, but suppressing it if other data elements trigger the exceptional condition, exceptional condition handling can effectively be managed with a single set of resources corresponding to a single data element without needing to duplicate these resources for each data element of the vector.

When a later element in the sequence triggers the exceptional condition, the element identifying information can be used to restart execution of the vector arithmetic instruction with the element that faulted now being the first active data element. In this way, repeated iterations of execution of the arithmetic instruction can gradually make forward progress through the elements of the vector, with any exceptional conditions being tracked using a single set of resources for the first active data elements on each pass, eliminating the need for multiple sets of resources per vector lane.

For example, when an exceptional condition is detected for the first active data element, the at least one response action may include updating a status register to indicate which exceptional condition(s) occurred. For example, the status register may include a set of bits which indicate different types of exceptional condition and the response may comprise setting the appropriate bits for the detected types of exceptional condition. By performing the response for the first active data element but not for other elements which trigger the exceptional condition, a single set of exceptional condition indicating bits can be shared between the data elements of the entire vector (with one bit per type of exceptional condition), and it is not necessary to provide multiple per-lane sets of status bits to track the exception conditions which occurred for every data element. This can greatly reduce the complexity of hardware not just in allowing a smaller status register to be used but also in reducing the number of status flags that are carried along the data path within the processing circuitry.

Also, the response action may comprise triggering execution of an exception handling routine. For example, when certain exceptional conditions occur then this may trigger a trap to an operating system or other control program, which may take action to handle the exceptional condition. Hence, the exception handling routine would be executed if the exceptional condition is detected for the first active data element in the sequence but not for other elements.

In some implementations certain exceptional conditions could always trigger an exception handling routine if they are detected for the first active data element in the sequence. Alternatively, a configuration register may be provided to specify configuration information which indicates whether to trigger the execution of the exception handling routine for different types of exceptional conditions. In this case then the response may comprise triggering the execution of the exception handling routine only when the configuration information in the configuration register specifies that the exception handling routine should be triggered for the detected type of exceptional condition.

Some systems may support speculative execution of vector operations, where a given condition governs whether or not certain elements of the vector need to be processed, but the vector instruction may be executed before the associated condition has actually been resolved. In some cases the associated condition may even depend on the result of executing the vector instruction for some elements of the vector, in order to determine whether other elements should actually be processed. Allowing such speculative execution may make it more efficient or practical to vectorise code compared to a system which requires knowledge of exactly which elements are to be processed before executing the instruction. For example, this is often useful when vector processing is used to process different iterations of the same program loop in parallel, and the different elements of the vector operand(s) correspond to values used or generated in different iterations of the same loop.

However, if speculative execution of the vector arithmetic instruction is possible then one consequence may be that some of the data elements of the first input vector are processed speculatively when it later turns out that they should not have been processed once the associated condition has been resolved. If these elements lead to an exceptional condition being detected, then this could lead to the response action being taken (e.g. updating of a status register or execution of an exception handling routine) when in fact this operation should not even have been performed in the first place. It would be undesirable to cause such side effects due to incorrectly speculated lanes of the vector processing.

One approach may be to maintain two different versions of the status register, one speculative version and one non-speculative version, and then to update the non-speculative version based on the speculative version once the speculatively executed lanes of processing have been committed. However, this may be more expensive in terms of hardware because additional registers would be required to track the speculative and non-speculative versions of the status register, as well as requiring additional instructions to be executed to resolve the committed versions of the status indications once the speculation has been resolved. By using the technique discussed above, this added overhead can be avoided because generally the first active data element in the sequence will be a non-speculatively executed lane of processing and so it is safe to perform a response action in response to an exceptional condition detected for this element. For the other elements of the input vector, even if these elements generate an exceptional condition, this does not trigger the response action, so if it later turns out that these lanes of processing were mis-speculated, then no adverse side-effect has been generated. Hence, the technique described above also helps to make handling of speculative execution of vector operations more efficient.

The active elements of the input vector may be determined in different ways. In some cases, all elements of the input vector may be considered to be active elements, so there may not be any data defining which data elements are active or inactive. That is, the input vector could be an unpredicated vector. In this case, the first active element may simply be the first element of the vector (e.g. the least significant element if the predetermined sequence is treated as extending from the least significant element to the most significant element).

However, a more flexible technique may be to associate the input vector with a mask which indicates which data elements are active or inactive data elements. In this case, the first active data element may be an element other than the first element of the input vector.

If the exceptional condition is detected for the given active data element other than the first active data element in the sequence, then the element identifying information can be used either to modify the mask associated with the vector arithmetic instruction for a subsequent attempt and to execute the instruction or to modify the input vector itself for the subsequent attempt. Either the mask can be updated so that the given element which triggered the exceptional condition becomes the first active data element in the sequence (e.g. preceding elements could now be indicated as inactive), or the positions of the elements in the first input vector could be modified so that now the first active data element of the new first input vector has the same value as the given active data element in the first input vector for the previous attempt to execute the instruction. The programmer may for example include one or more instructions in a loop surrounding the vector arithmetic instruction, to check the element identifying information produced by one attempt to execute the vector arithmetic instruction to see whether all the elements were processed successfully, and if the element identifying information identifies a given active data element has triggered the exceptional condition, then the mask or the input vector can be modified before looping back for another attempt. On the subsequent attempt, the given active data element may now be the first active data element and so if the exceptional condition still arises then the response action can be taken to allow the exceptional condition to be handled. Hence, the instruction may make forward progress through the elements of the input vector step by step using only a single set of resources for handling the exceptional condition.

In the case of updating the first input vector based on the element identifying information, this could be achieved by shifting the first input vector so that the given active data element becomes the first active data element (and any elements subsequent to the given active data element also move along in position in a corresponding element to the given active data element). Alternatively, if the vector arithmetic instruction follows an earlier vector load instruction which fills the first input vector (or an earlier vector used to generate the first input vector) with data loaded from a cache or memory, then the first input vector could effectively be updated by adjusting an address of the vector load instruction by an amount corresponding to the position of the given active data element within the original vector as indicated by the element identifying information, and repeating the vector load instruction as well as the vector arithmetic instruction itself. In this way, the next time the vector arithmetic instruction is executed, the vector load instruction will have loaded the data corresponding to the previously faulting data element into the position within the vector corresponding to the first active element.

The element identifying information could be represented in different ways. In some cases it may simply be an indication of the element number of the given active data element which triggered the exceptional condition. However, a particularly useful representation may be to provide an element identifying mask which comprises one or more indications having a first value for at least one data element preceding the given active data element in the sequence, and one or more indications having a second value for the given active data element and any subsequent active data element in the sequence. Hence, the element identifying mask essentially may partition the vector into a portion already processed without faults and a portion which may still cause a fault. Such an element identifying mask can enable the new mask for the subsequent attempt to execute the instruction to be generated more efficiently. Also, an element identifying mask of this type may be useful because there may be several successful instructions being executed to implement a series of data processing operations and if any one of these instructions encounters an exceptional condition for a given element then it may be desirable to stop the corresponding lane of processing being performed in the subsequent instructions. Hence, the element identifying mask of the type discussed above may be useful in generating masks for the subsequent instructions as well.

The predetermined sequence of elements for the input vector can be any arbitrary sequence. However, often it may be convenient for the first active data element in the sequence to be the least significant active data element of the first input vector. Subsequent elements in the sequence may then correspond to data elements of the input vector in increasing significance up to the most significant active data element. This approach may map best to the way in which vectorised code is written in practice. Nevertheless, other sequences, such as a sequence starting with the most significant active data element and ending with the least significant element, could be used.

If more than one active data element other than the first active data element in the sequence encountered the exceptional condition, then in some cases the element identifying information may identify each of these elements. Alternatively, the element identifying information could identify only the next element (after the first active data element) in the sequence that triggers the exceptional condition, and may not identify any other elements even if later elements would also cause an exceptional condition.

In some implementations, the processing circuitry could always handle the vector arithmetic instruction in the way discussed above, where the response action is taken only if the first active data element triggers the exceptional condition.

However, other implementations may also support a second type of vector arithmetic instruction for which the processing circuitry performs at least one response action in response to detecting the exceptional condition for any active data elements of the vector, regardless of whether the exceptional condition is detected for the first active element or a subsequent element. The first and second types of vector arithmetic instruction could be different instructions entirely (e.g. with different opcodes), or could correspond to a common instruction opcode with a field in the instruction encoding specifying whether the instruction is of the first type or the second type. Alternatively, the first and second types of vector arithmetic instruction could have the same encoding, but the first type of vector arithmetic instruction may be a vector arithmetic instruction executed in a first mode of the processing circuitry and the second type of vector instruction may be a vector arithmetic instruction executed in a second mode of the processing circuitry. For example, there could be a control register which specifies whether the processing circuitry is currently in the first or second mode.

Providing both first and second types of vector arithmetic instruction, where the first type of vector arithmetic instruction triggers a response action only when the first active element encounters an exception condition, and the second type may triggers the response action for any active element, can be useful to enable programmers to select between the alternative types of instruction depending on the properties of code to be executed. For example, if code requires speculative execution of vector operations as discussed above, then the first type may be selected to avoid inadvertently triggering a side-effect in response to vector lanes which end up not needing to be performed anyway. On the other hand, for non-speculative code, the second type of vector arithmetic instruction could be selected to improve performance as the second type of vector arithmetic instruction may be less likely to require several iterations to make progress through each element of the vector. Hence, providing both types of instructions may provide a better balance between correct behaviour and performance.

In some implementations, for the second type of vector arithmetic instruction the response to exceptional conditions being detected for any elements of the first input vector may comprise recording a precise indication of which elements triggered the exceptional conditions and which types of exception were detected. However, this may require a significant overhead. In practice, exceptional conditions may be rare and so this overhead may not be justified. Instead, the second type of vector arithmetic instruction may trigger a response action which comprises updating a status register to provide an indication of any of the types of exceptional condition which occurred for any active data elements of the input vector, without distinguishing which particular elements triggered which particular types of exceptional condition. In many cases this may be enough to allow an exception handling routine (e.g. such as the operating system) to determine how to resolve the exceptional conditions.

The exceptional condition may be any type of condition triggered by an arithmetic operation which indicates some unusual result or property that may need to be investigated further. The present technique is particularly useful for instructions where the arithmetic operation comprises a floating-point operation. The IEEE 754 standard for floating-point arithmetic specifies a number of exceptional conditions which should be tracked for floating point operations. For example, these exceptional conditions may include one or more of: overflow, underflow, inexacts, invalid operation or division by zero. Another kind of exceptional condition which could be tracked for a floating-point operation may be whether or not an input to a given arithmetic operation is denormal (i.e. its significant starts with at least one leading zero, rather than starting with a 1 as for normal floating-point values). As there are a relatively large number of exceptional conditions to be tracked, recording these for every lane of a vector would be very expensive and so the technique discussed above can greatly save hardware resources by allowing a single set of bits, one for each type of exception condition, to be shared between vector lanes.

The present technique can also be used for non-floating point operations. For example, for an integer operation, some instructions may perform a saturating arithmetic operation in which the result of the arithmetic operation is constrained to lie within certain minimum and maximum bounds. In this case, an exceptional condition could be generated when saturation of a value generated in the saturating arithmetic operation occurs. That is, if the arithmetic operation yields a result which is larger than the maximum bound or smaller than the minimum bound of the saturation, then the exceptional condition could be triggered.

For example, the arithmetic operation performed in response to the vector arithmetic instruction could be add, subtract, multiply, divide, multiply-add, multiply-subtract, square root, etc. The arithmetic operation could also be a conversion operation to convert the representation of a given data value to a different form, such as converting between different precision of floating-point values or converting between floating-point values and integer values. For some instructions, such as conversion instructions, the first input vector may be the only input vector for the instruction. For other instructions, such as an add, subtract or multiply instruction, there may also be a second input vector whose data elements are to be combined with the data elements of the first input vector. Some instructions may even satisfy three or more input vectors (e.g. multiply-add).

The present technique can also be implemented using a virtual machine. The virtual machine may be a program which when executed by a host apparatus provides an instruction execution environment for executing instructions so that the host apparatus appears from the programmers point of view as if it has the circuitry discussed above. The host processor need not itself actually have that circuitry, and instead the code of the virtual machine controls the host hardware to execute instructions as if such circuitry was provided. For example the virtual machine may be a computer program stored on a storage medium. The storage medium may be non-transitory.

FIG. 1 is a block diagram of a system in which the techniques of the described embodiments may be employed. In the example shown in FIG. 1, the system takes the form of a pipelined processor. Instructions are fetched from an instruction cache 15 (which is typically coupled to memory 55 via one or more further levels of cache such as a level 2 cache 50) by the fetch circuitry 10, from where they are passed through decode circuitry 20 which decodes each instruction in order to produce appropriate control signals for controlling downstream execution resources within the pipelined processor to perform the operations required by the instructions. The control signals forming the decoded instructions are passed to issue stage circuitry 25 for issuing to one or more execution pipelines 30, 35, 40, 80 within the pipelined processor. The execution pipelines 30, 35, 40, 80 may collectively be considered to form processing circuitry.

The issue stage circuitry 25 has access to the registers 60 in which data values required by the operations can be stored. In particular source operands for vector operations may be stored within the vector registers 65, and source operands for scalar operations may be stored in the scalar registers 75. In addition, one or more predicates (masks) may be stored in predicate registers 70, for use as control information for the data elements of vector operands processed when performing certain vector operations. One or more of the scalar registers may also be used to store data values used to derive such control information for use during performance of certain vector operations.

The registers 60 may also include a number of control registers 76 for providing various control information, such as configuration information for controlling the operation of the processing pipeline, or status information indicating conditions arising during processing or properties of the outcomes of instructions. For example a control register 76 may include a floating point configuration register (FPCR) 77, a floating point status register (FPSR) 78 and a first faulting register (FFR) 79, which will be described in more detail below.

The source operands and any associated control information can be routed via a path 47 into the issue stage circuitry 25, so that they can be dispatched to the appropriate execution unit along with the control signals identifying the operation(s) to be performed to implement each decoded instruction. The various execution units 30, 35, 40, 80 shown in FIG. 1 are assumed to be vector processing units for operating on vector operands, but separate execution units (not shown) can be provided if desired to handle any scalar operations supported by the apparatus.

Considering the various vector operations, arithmetic operations may for example be forwarded to the arithmetic logic unit (ALU) 30 along with the required source operands (and any control information such as a predicate), in order to enable an arithmetic or logical operation to be performed on those source operands, with the result value typically being output as a destination operand for storing in a specified register of the vector register bank 65.

In addition to the ALU 30, a floating point unit (FPU) 35 may be provided for performing floating point operations in response to decoded floating point instructions, and a vector permute unit 80 may be provided for performing certain permutation operations on vector operands. In addition, a load/store unit (LSU) 40 is used for performing load operations in order to load data values from the memory 55 (via the data cache 45 and any intervening further levels of cache such as level 2 cache 50) into specified registers within the register sets 60, and for performing store operations in order to store data values from those registers back to the memory 55. It will be appreciated that other types of execution unit not shown in FIG. 1 could also be provided.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) may be provided, for example register renaming circuitry to map the architectural registers specified by the instructions to physical registers from a pool of physical registers within the register bank 60 (the pool of physical registers typically being larger than the number of architectural registers), thereby enabling certain hazards to be removed, facilitating more use of out of order processing. In addition, a reorder buffer may typically be provided to keep track of the out of order execution, and to allow the results of the execution of the various instructions to be committed in order.

In the described embodiments, the circuitry of FIG. 1 is arranged to execute vector operations on vector operands stored in the vector registers 65, where a vector operand comprises a plurality of data elements. For certain vector operations performed on such a vector operands (such as arithmetic operations), the required operation may be applied in parallel (or iteratively) to the various data elements within the vector operand. Predicate information (also known as a mask) may be used to identify which data elements within a vector are active data elements for a particular vector operation, and hence are data elements to which the operation should be applied.

Figure 2:
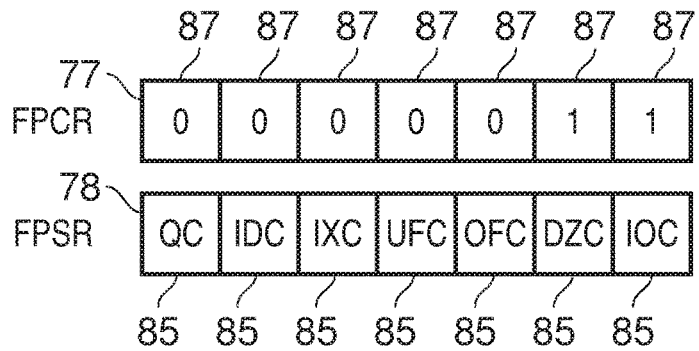
FIG. 2 illustrates an example of a floating point status register and a floating point control register.

FIG. 2 shows an example of the FPCR 77 and FPSR 78 in more detail. As shown in FIG. 2, the FPSR 78 may include a number of exception indicating bits 85 each corresponding to a different type of exceptional condition and indicating that at least one exceptional condition of the corresponding type has occurred since that bit 85 was last cleared. In this example the exception conditions indicated in the FPSR 78 include:

QC: integer saturation, occurs if the result of a saturating integer operation exceeds the maximum bound or is smaller than the minimum bound for the saturation;

IDC: input denormal, occurs if the input value to a floating point operation is denormal;

IXC: inexact, occurs if the outcome of a floating point operation cannot exactly be represented using the floating point format prescribed for the output;

UFC: underflow, occurs when a result of a floating point operation is smaller than can be represented using the floating point format prescribed for the output;

OFC: overflow, occurs if the result of a floating point operation is larger than can be represented using the floating point format prescribed for the output;

DZC: divide by zero, occurs if there is an attempt to divide by zero;

IOC: invalid operation, occurs if there is an attempt to execute an invalid operation.

It will be appreciated that other types of exceptional condition could also be indicated. The exception indicating bits 85 are cumulative in the sense that once set they will remain set until that bit of the FPSR 78, or the FPSR as a whole, is explicitly cleared by an instruction executed by the processing pipeline. Hence, while occurrence of an exception condition results in the corresponding bit being set, an instruction which does not trigger the exceptional condition would not clear the corresponding bit.

The FPCR 77 includes a number of exception masking bits 87 each corresponding to one of the types of exceptional condition indicated in the FPSR 78. The exception masking bits control whether or not each type of exceptional condition in the FPSR 78 would trigger a trap to the operating system to handle the type of exception. For example in the case of FIG. 2 the system is currently configured so that divide by zero or invalid operation exceptional conditions will trigger a trap to the operating system but the other kinds of exceptional condition will not. It will be appreciated that other information not shown in FIG. 2 could also be stored in the FPCR and the FPSR 78.

In this embodiment, a single FPSR 78 with a single exception indicating bit 85 per type of exception is provided, shared among all the vector lanes for a given vector operation. Hence the FPSR 78 is effectively a scalar FPSR and does not include per-lane bits indicating exceptions separately for each vector element.

Figure 3:
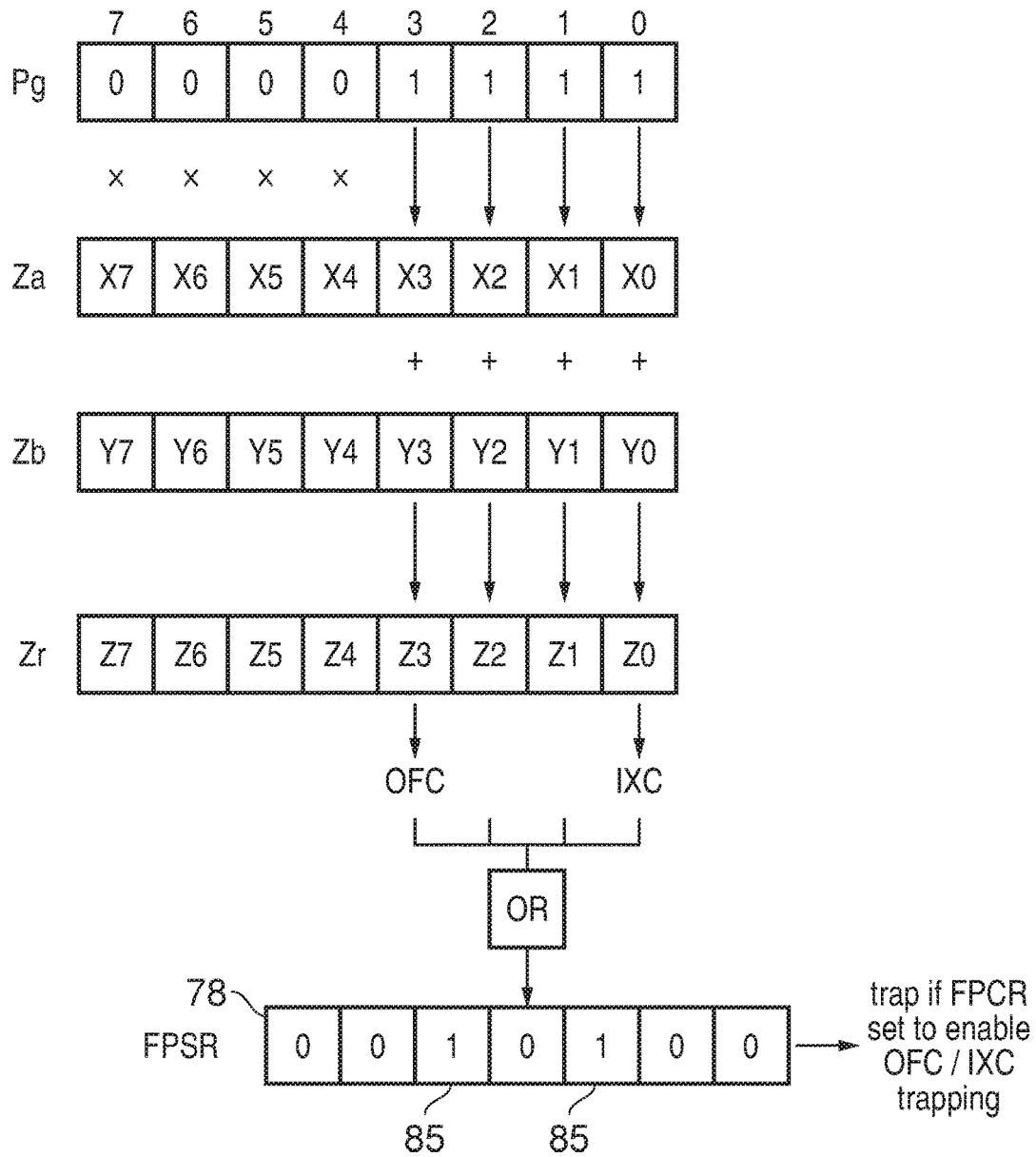
FIG. 3 shows an example of a non-first-faulting form of a vector arithmetic instruction.

FIG. 3 shows an example of a non-first-faulting form of a vector arithmetic instruction supported by the floating point unit 35. In this example the arithmetic operation to be performed is a floating point add operation. The instruction takes as inputs a pair of vectors Za, Zb stored in the vector registers 65, and a predicate Pg stored in the predicate registers 70 which provides a predicate value (or mask) which identifies which elements of the input vectors Za, Zb are active. In the example of FIG. 3, the mask indicates that elements 0-3 of Za and Zb are active and elements 4-7 are inactive. Hence, in response to the vector arithmetic instruction, the floating point unit 35 performs floating point additions of the corresponding elements X, Y in lanes 0-3 of registers Za, Zb to generate corresponding result elements Z0 to Z3 in a result register Zr. On the other hand, the elements Z4 to Z7 in the inactive lanes of the result register take values which are independent of the result of the additions which would otherwise be performed for those lanes. For example Z4 to Z7 could be set to a predetermined value such as zero, could be mapped directly to one of the input values in the corresponding lanes of Za, Zb, or could retain the values which were previously stored in the corresponding portions of the result register Za. Hence, only the active lanes are set to values which depend on the result of the arithmetic operation performed on the corresponding element of the input.

For the non-first-faulting form of the vector arithmetic instruction, if any exceptional conditions occur for any of the active lanes of the vector, then the corresponding bits in the FPSR 78 are set. Effectively, the indications of the exceptional conditions triggered by each of the active lanes may be combined using an OR operation to set the FPSR 78 accordingly. For example in FIG. 3 element Z0 triggers an inexact exception IXC and element Z3 triggers an overflow exception OFC and so the bits 85 corresponding to these types of exceptions are set in the FPSR 78. If the FPCR 77 indicates that these types of exceptions should trigger a trap to the operating system, then the trap is carried out and the operating system may execute an exception handling routine for dealing with these types of exceptions. Note that for the non-first-faulting form of the instruction shown in FIG. 3, the FPSR does not distinguish which particular elements triggered the exceptional conditions.

Figure 4:
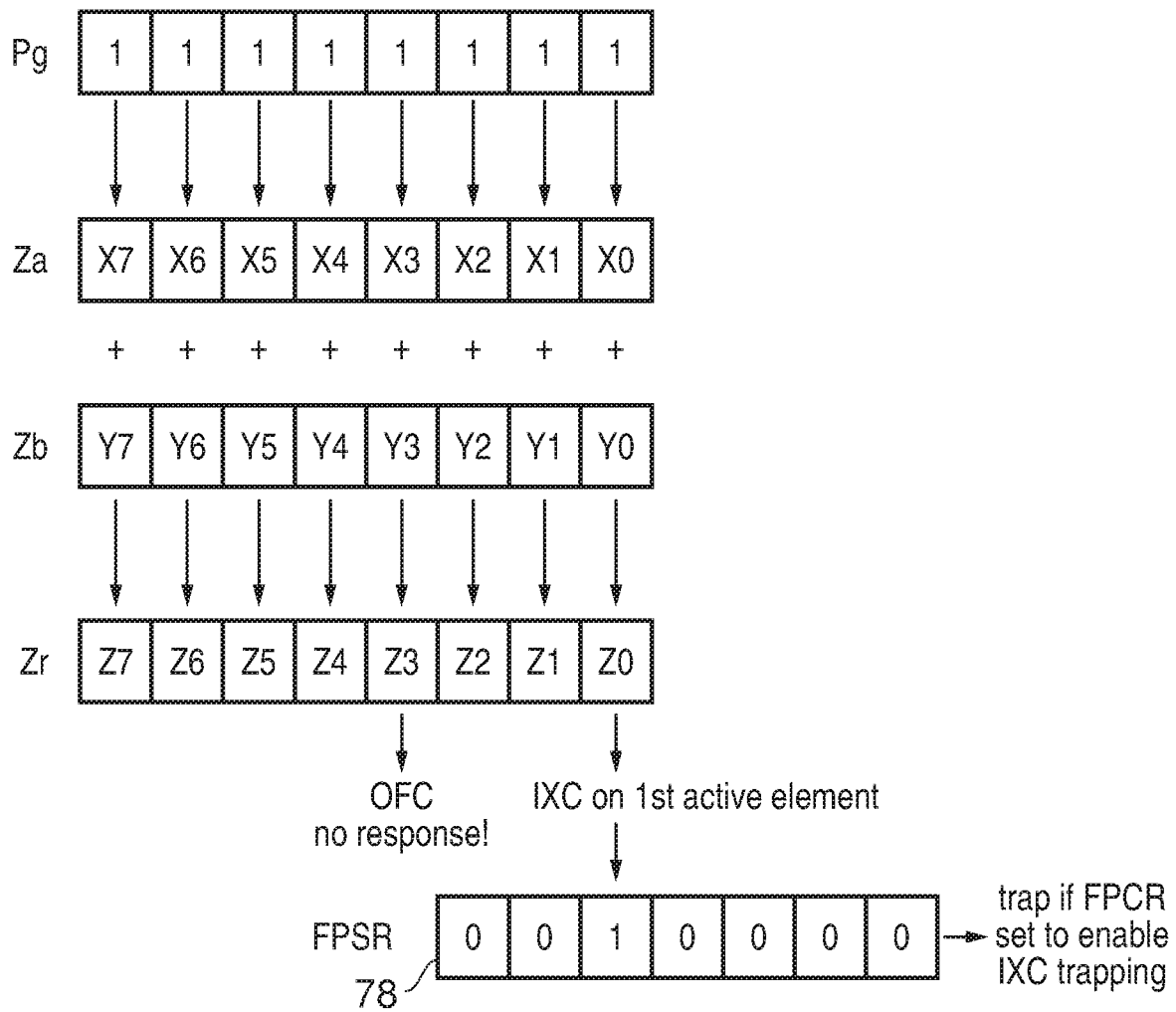
FIG. 4 shows an example of a first-faulting form of a vector arithmetic instruction, for which an exceptional condition occurs for a first active element of the vector.

FIG. 4 shows a different first-faulting form of the vector arithmetic instruction. The arithmetic operation itself is the same as in FIG. 3, where a floating point addition of corresponding elements in input vectors Za, Zb is performed for each lane for which the corresponding bit of the mask in predicate register Pg is 1. This time all the elements of the mask are one and so all of the elements are active for this example. In this example, the first-faulting form of the instruction shown in FIG. 4 has a different opcode compared to the non first faulting form of the instruction shown in FIG. 3. Alternatively, different forms of the instruction could share the same opcode but could include a field specifying which form of the instruction is being executed. Also, in some cases the encoding of the non first faulting and first faulting forms of the instruction could be entirely identical, but whether the instruction is considered to be of the first form or a second form may depend on the current operating mode of the processing circuitry. For example, there could be a bit in the FPCR 77 or one of the other control registers 76 which sets the mode of the processor to indicate whether vector arithmetic operations should be performed according to the non first faulting form of FIG. 3 of the first faulting form of FIG. 4.

For the first faulting form of the instruction shown in FIG. 4, exceptional conditions are handled differently compared to the non first faulting form in FIG. 3. As shown in FIG. 4, if an exceptional condition occurs for the arithmetic operation performed in the first active element of the vector (the least significant element X0/Y0/Z0 in this example), then the appropriate exception handling response is taken. For example this may include setting the corresponding bit in the FPSR 78 and, depending on whether the FPCR has enabled trapping of that kind of exception, trapping to the operating system as required. Even if an exceptional condition is detected for one of the other elements of the vector, no response is taken for this and the FPSR 78 is not updated based on any exceptional conditions which occurred for any elements other than the first active element of the vector. For example, in FIG. 4 the overflow bit of FPSR 78 is not set, even though an overflow was detected for the lane comprising corresponding to elements X3/Y3/Z3.

Figure 5:
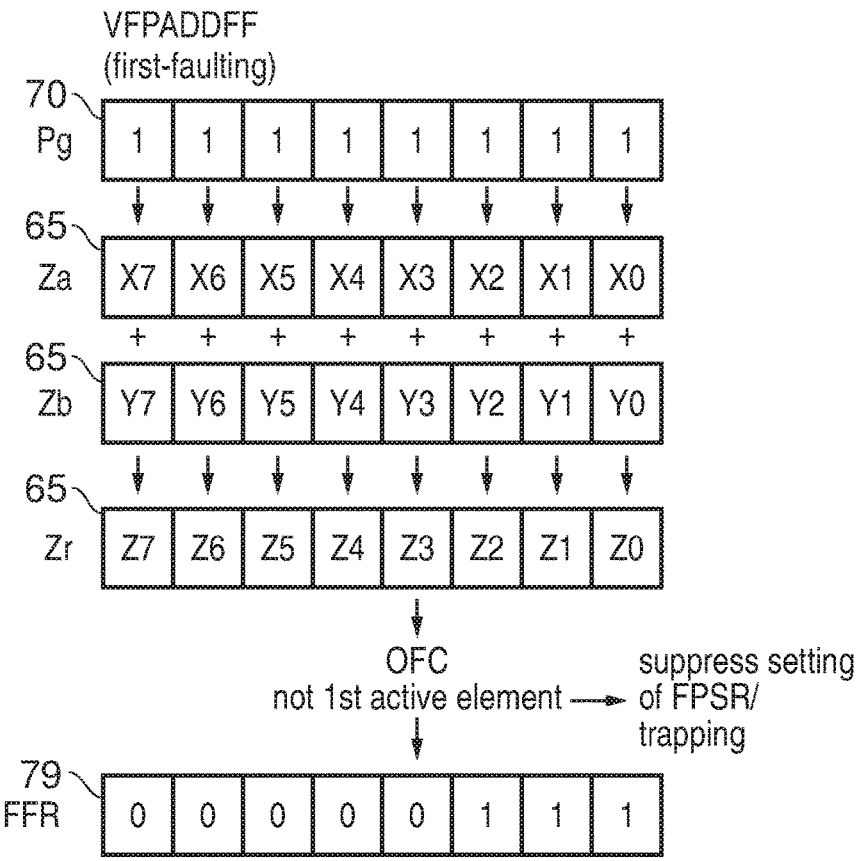
FIG. 5 shows an example of the first-faulting form of the vector arithmetic instruction, for which an exceptional condition occurs for an element which is not the first active element.

On the other hand, as shown in FIG. 5, for the first faulting form of the instruction, if the first active element does not trigger an exceptional condition, then the fault handling response is suppressed. Hence, the FPSR 78 remains unmodified and there is no trapping to the operating system. However, if the arithmetic operation for an element which is not the first active element in the vector triggers an exceptional condition, then as shown in FIG. 5 the first faulting register 79 is updated to record which element triggered the exception. As shown in FIG. 5, the first faulting register may correspond to a fault mask where the elements 0-2 which are less significant than the element 3 which triggered the fault are indicated with bit values of 1, and the mask bits in FFR 79 are 0 for element 3 which triggered the fault and any subsequent elements.

Figures 6, 7:
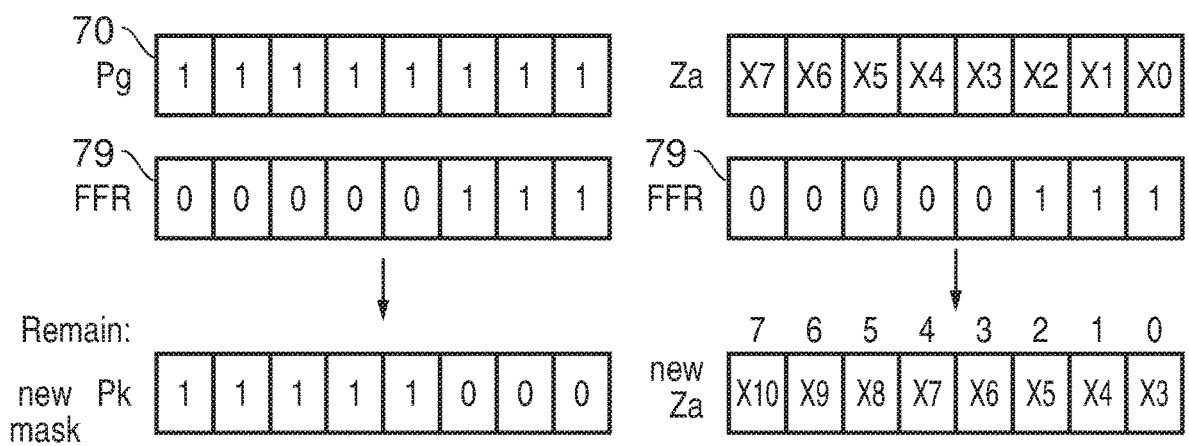
FIG. 6 shows an example of generating a new mask for a subsequent attempt to execute the first-faulting vector arithmetic instruction.
FIG. 7 shows an example of generating a new input vector for a subsequent attempt to execute the first-faulting vector arithmetic instruction.

The FFR 79 provides information which can be used by subsequent instructions to set up either the mask or the input vector for another attempt to execute the vector arithmetic instruction, if required. For example as shown in FIG. 6, the FFR 79 can be combined with the previous mask Pg to generate a new mask Pg' which represents the remaining elements which could still trigger an exceptional condition which has not yet been handled. For example this can be determined by clearing any bits of the original mask Pg equal to 1 for which the corresponding bits of FFR 79 are also 1. If the original mask Pg is all 1, another way of generating the new mask may be to subtract the FFR 79 from the original mask Pg.

Alternatively, as shown in FIG. 7, FFR 79 could be used to modify the input vector Za for the vector arithmetic instruction so as to reload the elements X3 to X7 indicated by a zero in the FFR 79 into vector positions 0 to 4 corresponding to the first active elements of the input vector. A similar operation could be performed for any other input vectors Zb and then the vector arithmetic instruction can be repeated so that now element X3 will be the first active element, and if this triggers the exceptional condition then this can be recorded in the FPSR and trapped if necessary.

Hence, the software using the vector arithmetic instruction may provide a loop around the vector arithmetic instruction which checks the FFR 79 to indicate which elements executed correctly without an exceptional condition and to repeat the instruction if necessary starting from the active element which previously triggered an exceptional condition. An example of such a loop is shown in FIG. 9 below.

This approach has several advantages. Firstly, this technique enables precise recording of the exception conditions which occurred for each element of the vector, including tracking of which particular element triggered the exceptional condition, using only a single set of exception indicating bits in the FPSR 78, to avoid the need to provide separate copies of the bits 85 for each vector lane, which can be very expensive when vectors become large as not only would a larger FPSR 78 be required but also this may require multiple copies of the floating point exception flags to be passed down the pipeline.

Also, the first faulting from the instruction can be useful for supporting speculative execution of vector operations. This is described in more detail with respect to FIGS. 8 and 9. FIG. 8 shows an example of a non-speculative execution of a given vector arithmetic instruction while FIG. 9 shows an example of a speculative execution of the instruction.

Vector instructions can be particularly useful if a given set of processing operations needs to be applied to each value in an array of data values, to generate corresponding results for each value of the array. Typically, code can be vectorised by providing a vector load instruction which loads a number of the data values to be processed from memory into a vector register, and then one or more vector arithmetic instructions to process each of the data elements of the loaded vector in some way to generate a result, before executing a vector store instruction to store the result values back to memory. However, often the total number of data values to be processed may not be an exact multiple of the vector length supported by the processing circuitry. Typically the vectorised code may include a loop which repeatedly iterates through a set of instructions including a vector load instruction and a number of vector arithmetic instructions, with each loop iteration handling a given block of data values corresponding to the vector length. Often some kind of stop condition may be defined in the loop to check whether all of the required data values have been processed, and if so to break the loop. The stop condition may be checked separately for each element of the vectors currently being processed and if the stop condition is determined to be met for one of the elements then this may indicate that later elements of that vector did not actually need to be processed.

For some vector instructions, the stop condition may be independent of the outcome of that vector instruction. As shown FIG. 8, for a given vector add instruction generating a result vector Zr based on input vector Za, Zb, the corresponding stop condition may depend on some other vector Zc so is independent of the result of the add. In this case, the vector add instruction can be considered to be non speculative, since it is known that its elements should be processed regardless of the outcome of the condition.

On the other hand, as shown in FIG. 9, for other examples the stop condition may depend on the result of the vector add instruction, for example in this case the stop condition checks whether any element j of the result vector generated by the vector add instruction meets some condition and if so the loop is broken. If one of the elements j of result vector Zr meets the condition, then this will indicate that any subsequent element j+1, j+2 etc. should not have been processed. An alternative approach would be to execute further instructions which check what the values of Zr would be before actually performing the vector operation non-speculatively, but this would require additional instructions and make it less easy to vectorise code. By allowing the vector add instruction to be executed speculatively before it is known whether all of its elements will actually be needed, performance can be improved. However, this can then lead to a situation where, if the non-first-faulting form of instruction was executed, the FPSR 78 could be updated based on an exceptional condition which occurs for a speculative lane of vector processing which later turns out not to be required. In this case the speculative execution may caused an unwanted side-effect in indicating a spurious exception and possibly trapping to the operating system unnecessarily.

This can be avoided by instead executing the first faulting form of the instruction as discussed with respect to FIGS. 4 and 5. The first active element of the vectors would generally be a non-speculative element, since even if that element meets the stop condition it is still a valid result. Hence, there is no problem in triggering the fault handling response in response to an exceptional condition triggered for the first active element. If any subsequent elements also trigger an exceptional condition, then this does not trigger the response and so does not lead to any unwanted side effects if these elements turn out to be mis-speculated. To allow the instruction to proceed correctly when the stop condition is not met, a loop is set up around the vector arithmetic instruction as shown in FIG. 9 in order to retry the instruction if the FFR 79 indicates that there are any remaining operations to be performed for any more elements of the vector. For example an instruction 100 may set all bits of the FFR before each attempt to execute the vector add instruction 102. Having resolved the condition, and broken the loop if necessary (instruction 104), then if the condition is not satisfied an instruction 106 modifies the mask Pk used by the vector arithmetic instruction 102 to indicate as active the remaining elements starting from the element which triggered the exception. This is determined based on the previous mask 70 and the FFR 79 as in the example of FIG. 6. A branch instruction 108 then branches back to instruction 100 if there is at least one remaining element still to be processed, i.e. if the new mask has any value other than a value in which all the bits are zero.

FIG. 10 shows an example of looping round multiple iterations of the vector arithmetic instruction in this way. On a first iteration, no exception occurs for the first active element, which is vector index [1] in this example but an exception is detected for the next active element at vector index [2]. As element [2] is not the first active data element, the exception response is not taken, and instead the FFR 79 is updated to clear the bits corresponding to elements [2] and [3]. The FFR 79 is then used to generate the new predicate for the second iteration round the loop, in which this time the first active element is lane [2] and so this time the exception triggers setting of the flag in the FPSR 78 and a trap to the operating system if required by the FPCR 77. Similarly, further iterations of the instruction can be performed if required to handle further exceptions in later elements in the sequence.

In practice, floating-point exceptions are rare and general purpose software very rarely relies on the values of the floating point status flags, so a solution that introduces some serialization when floating-point exceptions arise is perfectly acceptable in terms of performance. The programmer can select the first-faulting form of the instruction when speculative execution of vector processing is required, or if it is important to track precisely which particular elements of the vector triggered the exceptional conditions. In this case, by iterating through multiple loops of the instruction to handle the exceptions which arise on successive active elements step by step, precise exception handling is possible, and spurious exception handling triggered by mis-speculated lanes can be avoided.

On the other hand, if a vector operation is being executed non speculatively when it is already known that all the active elements do need to be processed, then the non-first-faulting form of the instruction can be selected to improve performance, and avoid the need for added instructions providing the loop surrounding the vector instruction. Similarly, if precise identification of which particular lane triggered an exception is not required then the non first faulting form of the instruction could be selected to merely record in the FPSR 78 which exception types occurred for any lanes without recording the particular lane that triggered the exception.

While the examples above show a case where the vector arithmetic instruction is an add instruction, it will be appreciated that a similar technique could be performed to a range of different kinds of arithmetic operations, including floating point operations and integer operations.

Figure 11:
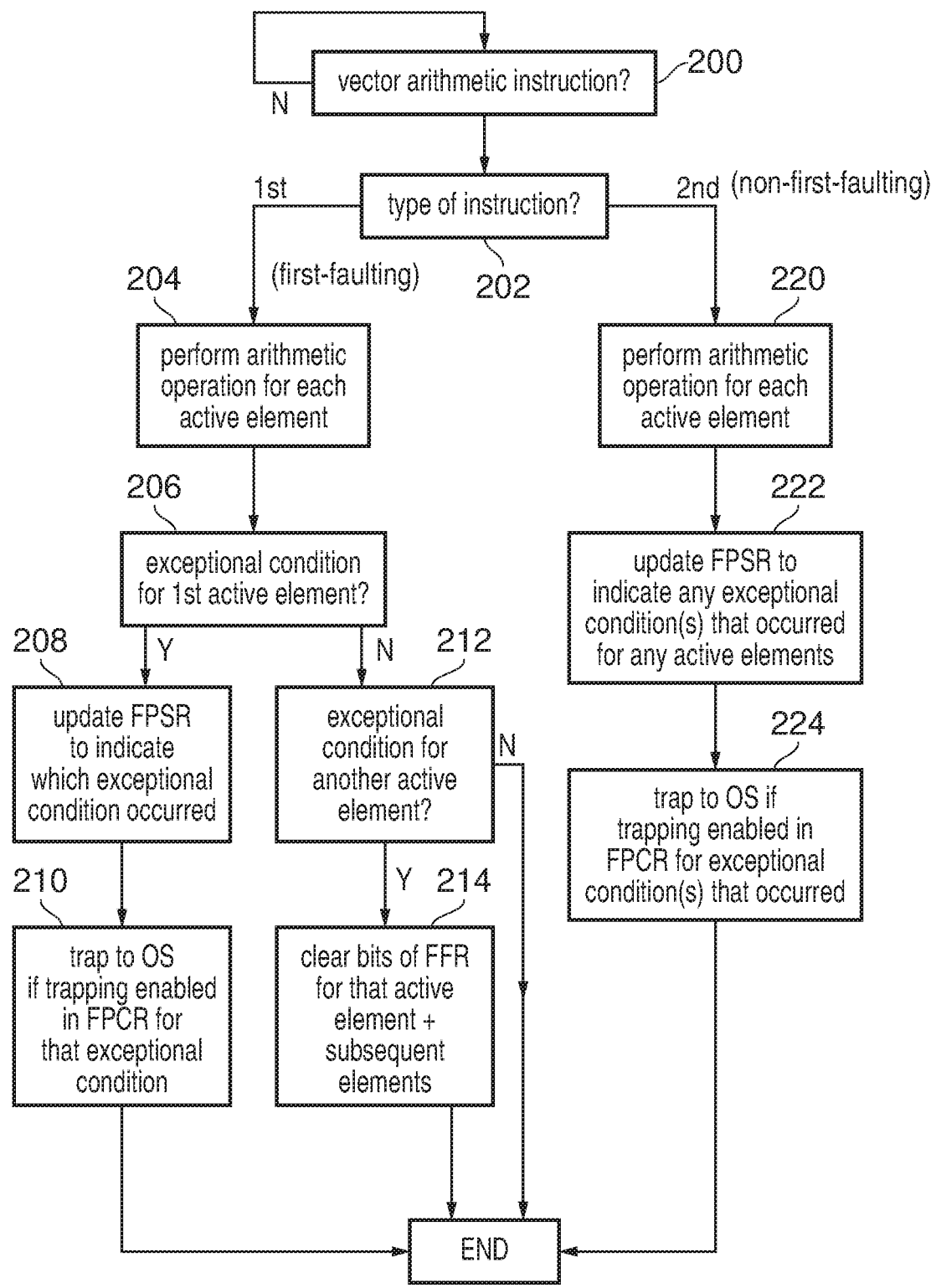
FIG. 11 is a flow diagram showing a method of processing a vector arithmetic instruction.

FIG. 11 is a flow diagram showing an example of processing a vector arithmetic instruction. At step 200 the processing pipeline detects whether the current instruction is a vector arithmetic instruction, and if not then the instruction is processed in some other way. When a vector arithmetic instruction is executed, then at step 202 the pipeline determines the type of instruction. If the instruction is of a first type (the first-faulting form of the instruction), then at step 204 the corresponding arithmetic operation is performed for each active element of the input vector to generate corresponding result elements of the result vector. At step 206 it is determined whether or not an exceptional condition was detected for the first active element of the vector. If so then at step 208 the FPSR 78 is updated to indicate which exceptional conditions occurred, and at step 210 the FPCR 77 is checked to determine whether trapping to the operating system is currently enabled for the exceptional conditions which were detected, and if so then a trap is triggered. On the other hand, if no exceptional condition occurred for the first active element then at step 212 the processing circuitry determines whether an exceptional condition occurred for another active element which is not the first active element. If so then at step 214 one or more bits of the FFR 79 are cleared for the active element which triggered the exceptional condition and any subsequent elements. On the other hand, if no exceptional condition occurred for any element then step 214 is skipped. The processing of the current vector arithmetic instruction then ends. As discussed above, further instructions may use the FFR 79 to modify the mask or the input vectors to the vector arithmetic instruction and then branch back to attempt the vector arithmetic instruction again if not all of the elements have yet been processed with their exception conditions handled fully.

On the other hand, if the current vector arithmetic instruction is of a second type (the non-first-faulting form of the instruction), then at step 220 the arithmetic operation is performed for each active element to generate corresponding result elements of the result vector. At step 222 the FPSR 78 is updated to indicate any exceptional conditions which occurred for any of the active elements of the vector. This does not distinguish which particular elements triggered the exception. At step 224 the processing circuitry again checks the FPCR to determine whether a trap to the operating system is required for any exceptional conditions that occurred, and if required, traps to the operating system. Processing of the instruction ends.

FIGS. 12 and 13 show an alternative approach for handling speculative updates to the floating point exception flags. Instead of providing first and second forms of the vector arithmetic instruction as discussed above, one type of vector arithmetic instruction could be provided which records the exception conditions which occurred for any vector lanes in a first version of the FPSR, FPSR1 78-1, corresponding to speculative processing of a vector instruction. Once the associated condition governing whether the speculation was correct has been resolved, then a commit instruction can be executed to copy the floating point exception flags for any correctly speculated lanes to a second version of the floating point status register FPSR2 78-2 which represents the non-speculative state (or committed version) of the FPSR (see FIG. 13). For example, the commit instruction may combine FPSR 1 78-1 and the previous value of FPSR 2 with an OR operation to generate the updated state for FPSR2. If required, a combine instruction can then be used to convert the vectorised view of the status flags into the traditional scalar view in FPSR 78 with a single flag per type of exception shared between the entire vector, indicating which exceptions occurred for a vector as a whole. For example, the combine instruction may OR the corresponding flags for a given exception in each lane of FPSR2 78-2 to generate an overall flag indicating whether that type of exception occurred for the vector as a whole.

FIG. 12 shows an example layout for FPSR 1 78-1 and FPSR 2 78-2 for capturing floating point and integer saturation status in byte-wide flag elements which align with a least significant byte of any data element which causes a floating point exception or an integer saturation to occur. Since the smallest floating-point element is typically 32 bits wide while integer elements may be 8 bits, this means that the floating point status flags 85 appear only in flag element numbers that are a multiple of 4, whereas the integer saturation flag QC occurs in each byte. Unused bits need not be stored by hardware and return zero when read. Bits in the register may be accept one of the side effects of a Shoji floating point or saturating integer operation on an active vector element. The least significant 32 bits of FPSR 1 and FPSR 2 are shown in FIG. 12 but this may repeat up to the maximum vector length.

Figure 14:
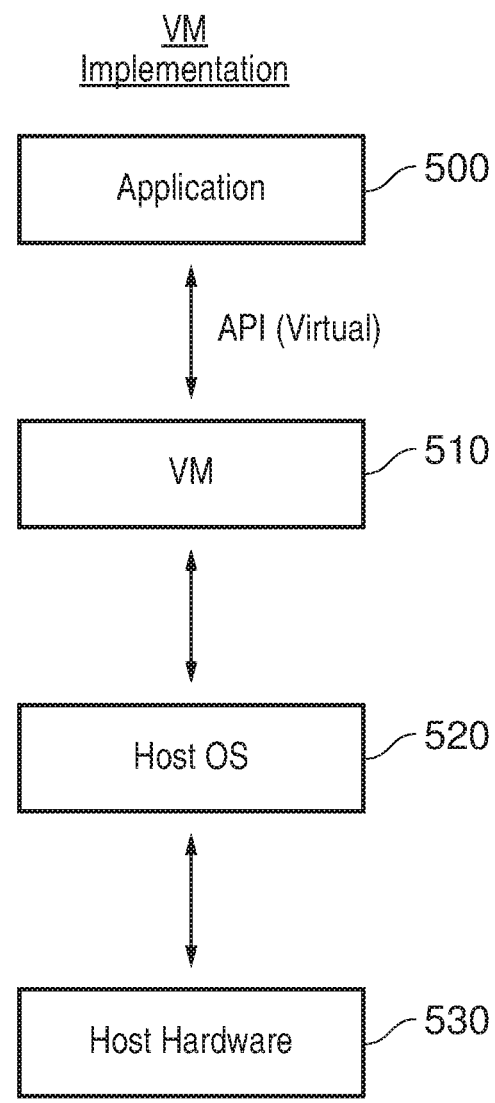
FIG. 14 shows a virtual machine implementation.

FIG. 14 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
    processing circuitry to perform, in response to a first type of vector arithmetic instruction specifying at least a first input vector comprising a plurality of data elements, an arithmetic operation for at least one active data element of the first input vector;
    wherein the data elements of the first input vector have a predetermined sequence;
    when at least one exceptional condition is detected for the arithmetic operation performed for a first active data element in the predetermined sequence, the processing circuitry is configured to perform at least one response action; and
    when the at least one exceptional condition is detected for the arithmetic operation performed for a given active data element other than said first active data element in said predetermined sequence, the processing circuitry is configured to suppress said at least one response action and to store element identifying information identifying which data element of the first input vector is said given active data element;
    wherein said at least one response action comprises updating a status register to indicate the type of exceptional condition detected for the first active data element, the status register comprising a single set of exceptional condition indicating bits for indicating the type of exceptional condition, where each exceptional condition indicating bit of said single set of exceptional condition indicating bits is shared between the plurality of data elements of the first input vector.

2. The apparatus according to claim 1, wherein the set of exceptional condition indicating bits comprises a single bit per type of exceptional condition.

3. The apparatus according to claim 1, wherein said at least one response action comprises triggering execution of an exception handling routine.

4. The apparatus according to claim 3, comprising a configuration register to store configuration information specifying whether to trigger execution of the exception handling routine for one or more types of exceptional condition; and
    the at least one response action comprises triggering execution of the exception handling routine when the configuration information specifies that the exception handling routine should be triggered for the detected type of exceptional condition.

5. The apparatus according to claim 1, wherein the processing circuitry is configured to perform the arithmetic operation for one or more active data elements of the first input vector before an associated condition for determining whether the one or more active data elements should be processed has been resolved.

6. The apparatus according to claim 1, wherein the first input vector is associated with a mask indicating which data elements of the first input vector are active data elements.

7. The apparatus according to claim 6, wherein the processing circuitry is responsive to at least one further instruction to generate, based on the element identifying information, at least one of a new first input vector and a new mask for a subsequent attempt to execute a vector arithmetic instruction of the first type.

8. The apparatus according to claim 7, wherein one of:
    the processing circuitry is responsive to said at least one further instruction to generate the new mask with the given active data element indicated as the first active data element in said predetermined sequence; and
    the processing circuitry is responsive to said at least one further instruction to generate the new first input vector with the first active data element of the new first input vector having the same value as the given active data element in the first input vector.

9. The apparatus according to claim 1, wherein the element identifying information comprises an element identifying mask comprising one or more indications having a first value for at least one data element preceding the given active data element in the predetermined sequence, and one or more indications having a second value for the given active data element and any subsequent active data element in the predetermined sequence.

10. The apparatus according to claim 1, wherein the first active data element in the predetermined sequence comprises a least significant active data element of the first input vector.

11. The apparatus according to claim 1, wherein in response to a second type of vector arithmetic instruction, the processing circuitry is configured to perform said at least one response action in response to detecting said at least one exceptional condition for the arithmetic operation performed for any active data element of said first input vector.

12. The apparatus according to claim 11, wherein one of:
    the first and second types of vector arithmetic instruction comprise different opcodes or comprise a field specifying whether the vector instruction is of the first type or second type; and
    the first type of vector arithmetic instruction comprises a vector arithmetic instruction executed in a first mode of the processing circuitry, and the second type of vector instruction comprises a vector arithmetic instruction executed in a second mode of the processing circuitry.

13. The apparatus according to claim 11, wherein in response to the second type of vector arithmetic instruction, said at least one response action comprises updating a status register to provide an indication of one or more types of exceptional condition which were detected for the arithmetic operations performed for any active data elements of the first input vector.

14. The apparatus according to claim 1, wherein the arithmetic operation comprises a floating-point operation and the at least one exceptional condition comprises at least one of:
    overflow of a floating-point value generated in the arithmetic operation;
    underflow of a floating-point value generated in the arithmetic operation;
    a floating-point value generated in the arithmetic operation being inexact;
    the arithmetic operation corresponding to an invalid operation;
    the arithmetic operation comprising a division by zero; and
    an input to the arithmetic operation being denormal.

15. The apparatus according to claim 1, wherein the arithmetic operation comprises a saturating arithmetic operation, and the at least one exceptional condition comprises saturation of a value generated in the saturating arithmetic operation.

16. A non-transitory, computer-readable storage medium storing a computer program that, when executed by a data processing apparatus, provides a virtual machine which provides an instruction execution environment corresponding to the apparatus of claim 1.

17. The apparatus according to claim 1, wherein the status register does not specify the type of exceptional condition separately for each vector element.

18. The apparatus according to claim 1, wherein each exceptional condition indicating bit of said single set of exceptional condition indicating bits is allowed to be updated in response to an exceptional condition detected for any of the plurality of data elements of the first input vector.

19. The apparatus according to claim 1, wherein in response to a given type of exceptional condition detected for the first active data element, the processing circuitry is configured to set the same bit of said single set of exceptional condition indicating bits regardless of which of the plurality of data elements of the first input vector is the first active data element.

20. A data processing method comprising:
in response to a first type of vector arithmetic instruction specifying at least a first input vector comprising a plurality of data elements, performing an arithmetic operation for at least one active data element of the first input vector, wherein the data elements of the first input vector have a predetermined sequence;
when at least one exceptional condition is detected for the arithmetic operation performed for a first active data element in the predetermined sequence, performing at least one response action; and
when the at least one exceptional condition is detected for the arithmetic operation performed for a given active data element other than said first active data element in said predetermined sequence, suppressing said at least one response action and storing element identifying information identifying which data element of the first input vector is said given active data element;
wherein said at least one response action comprises updating a status register to indicate the type of exceptional condition detected for the first active data element, the status register comprising a single set of exceptional condition indicating bits for indicating the type of exceptional condition, where each exceptional condition indicating bit of said single set of exceptional condition indicating bits is shared between the plurality of data elements of the first input vector.

\* \* \* \* \*